US006726831B2

(12) United States Patent
Bass et al.

(10) Patent No.: US 6,726,831 B2
(45) Date of Patent: Apr. 27, 2004

(54) CORROSION PROTECTION OF ELECTRICALLY HEATED PIPE-IN-PIPE SUBSEA PIPELINE

(75) Inventors: Ronald Marshall Bass, Houston, TX (US); Stephen Lance Wolfson, Kemah, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/910,489

(22) Filed: Jul. 20, 2001

(65) Prior Publication Data

US 2003/0015436 A1 Jan. 23, 2003

(51) Int. Cl.[7] ............................................... C23F 13/00
(52) U.S. Cl. .................. 205/740; 205/724; 204/196.01; 204/196.19; 204/196.37
(58) Field of Search ............................. 205/740, 724; 204/196.01, 196.19, 196.37

(56) References Cited

U.S. PATENT DOCUMENTS

| | | | | |
|---|---|---|---|---|
| 6,142,707 A | | 11/2000 | Bass et al. ................... | 405/158 |
| 6,171,025 B1 | * | 1/2001 | Langner et al. ............. | 405/154 |
| 6,364,401 B1 | * | 7/2001 | Langner et al. ............. | 405/169 |
| 6,278,096 B1 | * | 8/2001 | Bass ........................... | 219/629 |
| 6,292,627 B1 | * | 9/2001 | Gilchrist, Jr. et al. ....... | 392/311 |
| 6,315,497 B1 | * | 11/2001 | Wittman et al. ............ | 405/158 |
| 6,371,693 B1 | * | 4/2002 | Koop et al. ................. | 405/158 |

FOREIGN PATENT DOCUMENTS

| | | |
|---|---|---|
| EP | 1070907 | 1/2001 |
| GB | 2084284 | 4/1982 |
| RU | 569815 | 9/1977 |
| WO | 103122 | 4/1937 |
| WO | 1359445 | 3/1972 |
| WO | 1437587 | 7/1974 |
| WO | 1532730 | 10/1976 |

OTHER PUBLICATIONS

"Direct Impedance Heating of Deepwater Flowlines," OTC 11037, May, 1999.
"Cable–Free Electrical Systems for the Oil to Gas Industry," Production Technologies Company, L.L.C., 600 Kenrick, Suite C–30; Houston Texas 77060, advertisement, Copyright 1996, 6 pp.
"Dunbar in Depth," Offshore Engineer, Dec. 1994, 2 pp.
"Introduction to Direct Heating of Subsea Pipielines," overview byStatoil, Saga Petroleum, CSO Norge, Alcatel, Kabel Norge and EFI, Feb. 1988.
"Monolithic Pipeline Electrical Isolation Joints," Hydro Tech Systems, Inc., Engineered Pipeline Products, advertisement, Nov. 1996, 6 pp.
"New Double Pipe Insulated Systems (DPIS) Designated by Snamprogetti" , Snamprogetti Offshore Division, Viale de Gasperi 16, San Donato Milanese, Milan, Italy, advertisement, 6 pp.
"Skin Effect Pipe Heating Systems," Thermo Systems Technology, Inc. (TST), Four Commerce Park Square, 23200 Chagrin Boulevard, Suite 600, Beachwood, Ohio 44122, Copyright 1991, advertisement, 3 pp.

(List continued on next page.)

Primary Examiner—Bruce F. Bell

(57) ABSTRACT

Apparatus and method for providing corrosion protection of subsea pipe-in-pipe electrically heated pipeline are provided. The exterior surface of the outer pipe is coated with a thick protective coating in and near the splash zone and near the bulkhead of the heated line. A discharge electrode is placed over the thick protective covering or bare pipe is created near the thick protective covering. Methods are provided for determining the area needed in the discharge electrode or bare pipe.

15 Claims, 6 Drawing Sheets

OTHER PUBLICATIONS

Stop Paraffin Build–up and Realize Your Well's Full Potential . . . Plug in Paratrol. International, Inc. (PTI), 15423 Vantage Parkway East, Houston, Texas 77032, advertisement, Copyright 1989, 6 pp.

"Tubing Casing Wireless Telemetry (Tucas System)," Schlumberger web page (1993?/Jun. 1996), 16 pp.

A. Anselmi et al., "TTDPIS: A New Underwater Technology in the Field of Traced Insulated Pipelines," 1994 OMAE, vol. 5, Pipeline Technology, ASME, 1994, pp. 69–76.

Anonymous, "Insulated Pipe –Precision Engineering, June 2000, The Bayou Bulletin, Issue #8 from www.bayoupip.com/4News/Newslwtter0 8–4.thm, 2 pages.

Anonymous, "Insulated Technique to see first use in North Sea Development" , May 17, 1993, Oil and Gas Journal vol. 91 Issue 20, page 61.

B. J. Eastlund et al., "New System Stops Paraffin Buildup," Petroleum Engineer, Jan. 1989, 3 pp.

Brochure –Combi Pipe –the end of clogged pipelines, Alcatel Contracting Norway and Aker Engineering, 7 pp.

Brochure –World Wide Experienced List –Compressed Gas Insulated Transmission Bus System Type CGIT, ABB Power T & D Company Inc., 30 Oak Street, Westborough, MA 01581, USA, 6 pp.

C. G. Langer, "Engineering Report—1979 Construction of the Cognac 12–inch Pipeline From Mississippi Canyon Block 194 to Southwest Pass East Bay Central Facilities, Offshore Louisiana," ES No. 74–82, Job no. 560513, Shell Oil Company, Pipeline Construction Department, *, 6 pp.

Compressed Gas Insulation Transmission Bus Ducts, ABB Power T&D Company, CGIT/PB Division, Westborough, MA, US 22 pages.

DeLuca, "Field of Dreams" , Apr. 1, 2001, Offshore Engineering, from www.online.com/news/features/oe/2001 0401.Fields 0.520.asp, 9 pages.

A. B. Hansen, T. L. Clasen and R. M. Bass, "Direct Impedance Heating of Deepwater Flowlines " , OTC 11037, pp. 691–701.

F. Aarseth and E. Bentsen, "Heating of Pipelines, and Power Supply to Subsea Electrical Equipment," Aker Engineering a.s. A. Bjømstad and B. Knutsen, Alcatel Contracting Norway A.s., DOT 1995, 23 pp.

F. R. Newbold and T. K. Perkins, "Wellbore Transmission of Electrical Power,", The Journal of Canadian Petroleum Technology, Jul.–Sep. 1978, Montreal, pp. 3–52.

F. G. Bosch, K. J. Schmitt, and B. J. Eastlund, "Evaluation of Downhole Electric Impedance Heating systems for Paraffin Control," Paper no. PCIC–90–34 presented at Industry Application Society 37th Annual Petroleum and Chemical Industry Conference, Houston, Texas, Sep. 10–12, pp. 223–227.

Fred S. Epstein and Gary L. White, "Understanding Impedance Heating," Chemical Engineering, May 1996, pp. 112–118.

Gaylord, N.G., Gaylord Associates, Newark, New Jersey, "Polymers –Part I. Polyalklene Oxides and Other Polethers"; Interscience Publishers: New York–London–Sydney, pp. 9–80.

"General Product Specification—Pipeline Insulating Joint," HydroTech Systems, Engineered Pipeline Products, advertisement, pp.

H. Collins and M.S.R. Lyle, Progress Reported inDesign of Reelable Insulated Subsea Flow Lines," Oil and Gas Journal ", Sep. 24, 1990, pp.102–106.

Krevelen, D. W., Univ. of Technology. Delft. The Netherlands, "Properties of Polymers", 3.sup.rd Edition (Revised), Elsevier; Amsterdam–Oxford–New York–Tokyo, 1990; pp. 641–653.

K. H. Akfhampour, "A Novel Approach to Solving Downhole Fluid Flow Problems by Use of an Electric Heating System", Paper no. PCIC–85–35, 12 pp.

M. I. Mollison, "Foam Insulation Gets First Reeled Installation off Australia," Oil and Gas Journal, May 18, 1992, pp. 80–82.

Monobloc Insulating Joints Type "IK".

N. B. Carson, "A New Method for Heating Tracing Long Pipelines,"ASME, 74–Pet–35, paper presented at the Petroleum Mechanical Engineering Conference, Dallas, Texas, Sep. 15–18, 1974, pp. 2–4.

Protest Document, Dec. 8, 1987 letter of Andrew W. Marr, Jr. to the Assistant Commisioner of Patents requesting issuance of U.S. Pat. No. 4,716,960 available in the file history as of Jan. 5, 1988.

R. Wash, "Electromagnetic Energy Helps Recovery," Gulf Coast World,, Jun. 1986, pp. 18–19.

"Talking Induction Heating Underwater,"Process Heating, Jul./Aug. 1995, 1 p.

The Electrothermic Co. (TEC), 4916 Bear Lane, P.O. Box 4227, Corpus Christi, TX 78408 advertisement/sales brochure, 4 pp.

* cited by examiner

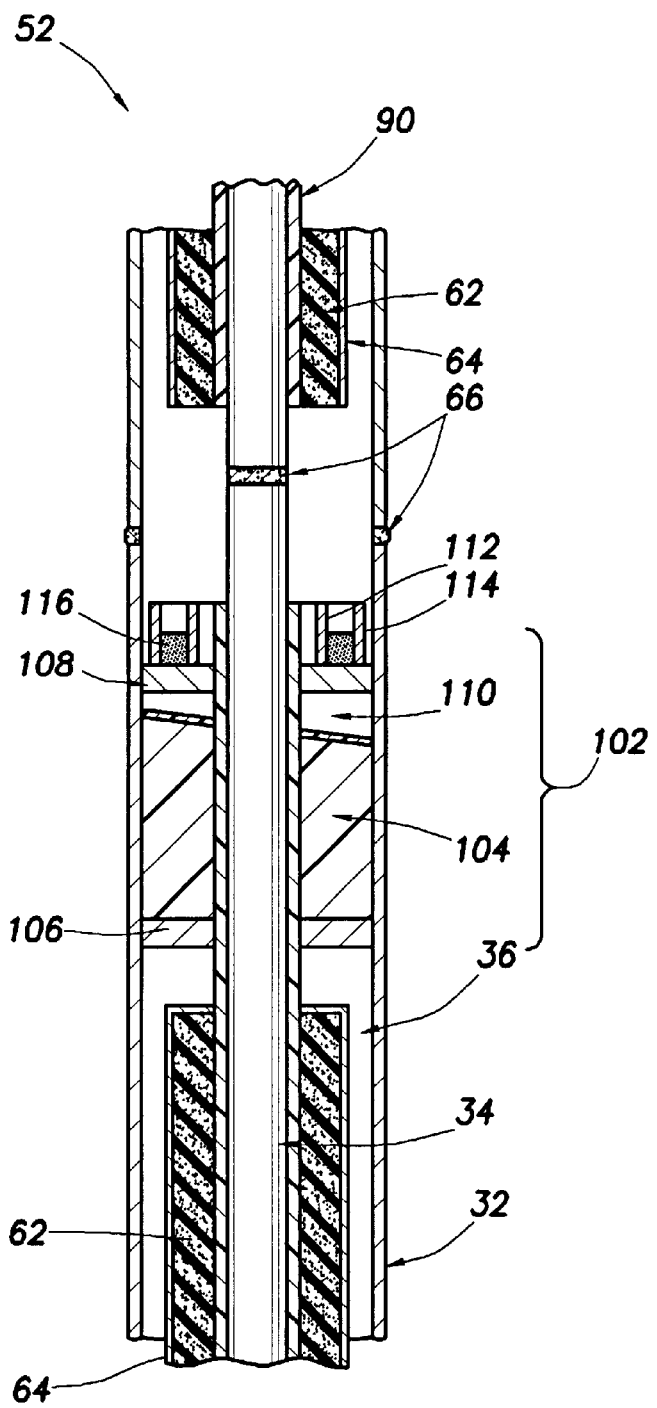
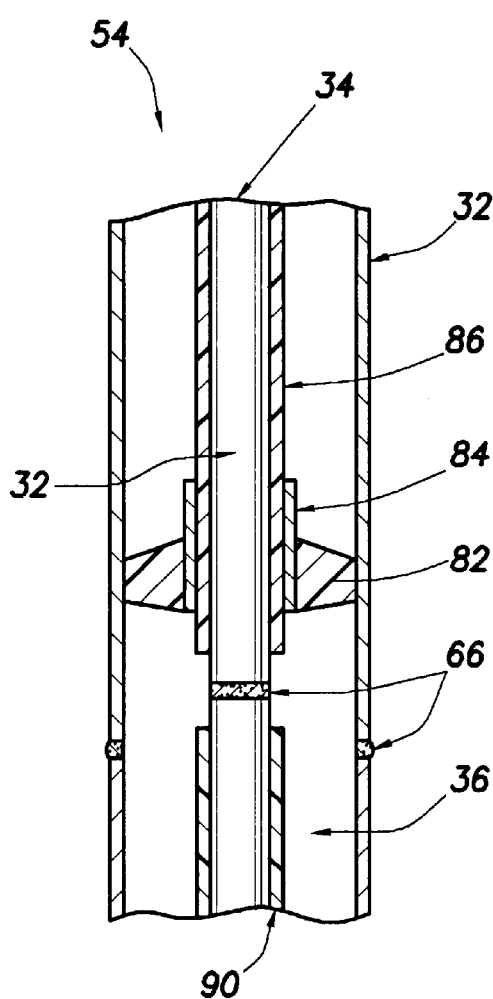
FIG.3
FIG.4

CORROSION PROTECTION OF ELECTRICALLY HEATED PIPE-IN-PIPE SUBSEA PIPELINE

BACKGROUND OF THE INVENTION

1. Field of the Invention

The present invention relates to electrical heating of subsea pipelines. More particularly the invention relates to corrosion protection while electrical heating with a pipe-inside-pipe configuration.

2. Description of Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep and where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable. Hydrocarbon gas under pressure combines with water at reduced temperatures to form a solid material, called a "hydrate." Hydrates can plug pipelines and the plugs are very difficult to remove. In deep water, conventional methods of depressuring the flow line to remove a hydrate plug may not be effective. Higher pressures in the line and uneven sea floor topography require excessive time and may create more operational problems and be costly in terms of lost production.

The problem of lower temperatures in subsea pipelines has been addressed by a variety of heating methods, including electrical heating. Heating by a variety of electrical methods is well known in the industry. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999). One electrical heating method is the pipe-in-pipe-method. In one configuration of this method, a pipe-in-pipe subsea pipeline is provided by which a flow line for transporting well fluids is the inner pipe and it is surrounded concentrically by and electrically insulated from an electrically conductive outer pipe until the two pipes are electrically connected at bulkhead at the distal or remote end of a heated segment. Voltage is applied between the inner and outer pipes at the proximate or electrical input end and electrical current flows along the exterior surface of the inner pipe and along the interior surface of the outer pipe. This pipe-in-pipe method of heating is disclosed, for example, in U.S. Pat. No. 6,142,707, which is commonly assigned and hereby incorporated by reference herein. Other variations of the general pipe-in-pipe method exist.

In pipe-in-pipe electric heating configurations, an annulus design that electrically isolates the inner and outer pipe and provides thermal insulation and load sharing is desirable. Electrical isolation between the inner and outer pipe is needed so that the pipes will not short out. Thermal insulation is advantageous because it minimizes heat loss from the inner pipe and reduces the amount of electrical current necessary to achieve the desired temperature in the inner pipe. Load sharing between the pipes helps limit the stress on the outer pipe during laying.

It has been found that leakage currents enter and leave a subsea pipe-in-pipe pipeline when electrical current flows along the pipeline. The currents enter or leave the outer pipe of the pipeline only near where the pipeline enters the water and near the remote end of the heated segment. It has also been found that accelerated corrosion of metal occurs when electrical current flows from the metal into seawater, even when 60 Hz alternating current is used, if the current density per unit area is excessive. This corrosion can deplete the pipe thickness and possibly result in pipe rupture or a decrease in overall life of the pipeline. A method for protecting the pipe-in-pipe flowline from the corrosive effects of the leakage current and a method for selecting the size of the apparatus are needed.

SUMMARY OF THE INVENTION

Towards providing these and other advantages, the present invention in one embodiment provides a method for mitigating corrosion during electrical current flow in a pipe-in-pipe subsea pipeline by applying a protective layer over the outer pipe in and near the splash zone and in the vicinity of the bulkhead and attaching a sacrificial current discharge electrode over the protective layer. The discharge electrode is electrically connected to the outer pipe below the splash zone and near the bulkhead. In another embodiment, a bare area of the outer pipe, i.e., an area without any coating over the metal, is provided to serve as a discharge electrode. The area of the discharge electrode or the bare pipe is selected to decrease current density from seawater to the area of the heated segment where leakage current leaves or enters the pipe. This current density is preferably decreased to a value that provides corrosion rates not greatly affected by the current flow through the surface of the sacrificial electrode or bare pipe. The required area of the sacrificial electrode or bare pipe may be estimated from calculations of current density at different values of electric field along the pipeline and calculations or measurements of electric field near the ends of the heated segment of the pipeline, along with results of measurements of corrosion rates versus current density. Measurements of electric field along the pipeline are preferably made for the pipeline to be used.

DESCRIPTION OF THE DRAWING

For a more complete understanding of the invention and the advantages thereof, reference is now made to the following description taken in conjunction with the following drawings in which like reference numbers indicate features and wherein:

FIG. 3 is a cross-sectional sketch of the annulus between the inner and outer pipes of the heated pipeline in segments of a pipeline where higher thermal insulation is needed.

FIG. 4 is a cross-sectional sketch of the annulus between the inner and outer pipes of a heated pipeline in segments of the pipeline where less thermal insulation is needed.

DETAILED DESCRIPTION

U.S. Pat. No. 6,142,707 and concurrently filed U.S. patent applications entitled "Annulus for Electrically Heated Pipe-in-Pipe Pipeline," Ser. No. 09/910,696 and "Power Supply for Electrically Heated Subsea Pipeline," Ser. No. 09/910,625, all commonly owned, are hereby incorporated by reference herein.

Figure 1:
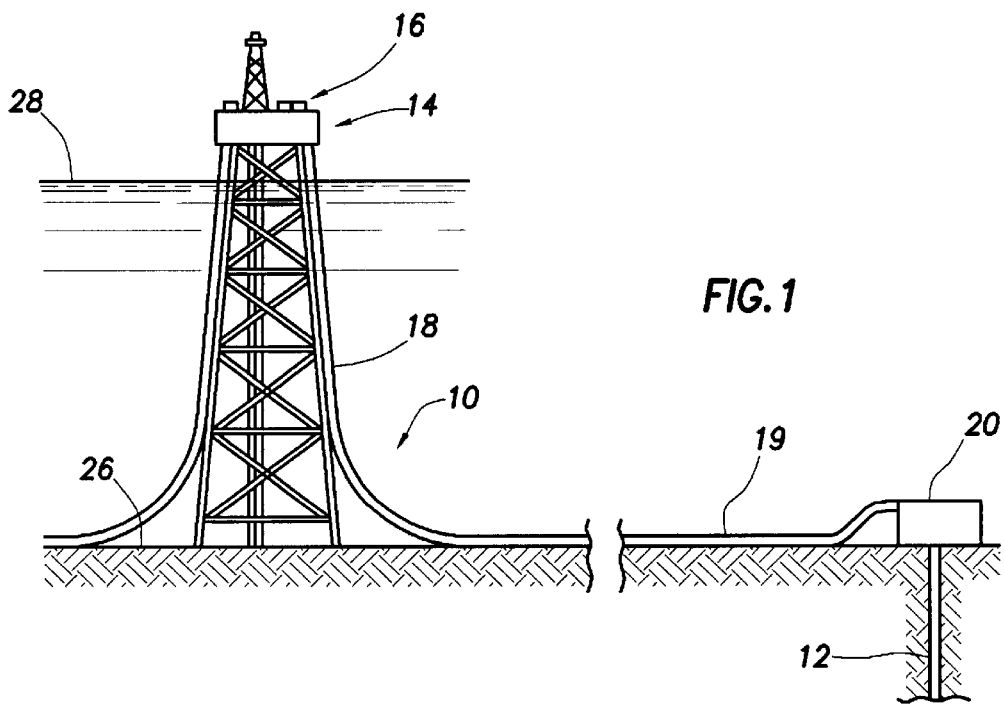
FIG. 1 is a view of a platform and a satellite subsea well connected by subsea pipeline.

FIG. 1 illustrates the environment of the present invention. Here remote satellite well 12 is connected to platform 14 with subsea pipe-in-pipe flowline 10. Subsea pipe-in-pipe flowline 10 is provided with electrical heating in accordance with the present invention. Seafloor section 19 of subsea pipe-in-pipe flowline 10 is brought to surface facilities 16 on platform 14 through riser section 18. Subsea pipe-in-pipe flowline 10 connecting satellite well 12 to surface facilities 16 on platform 14 may be up to 20 to 40 or more miles long. Pipe-in-pipe flowline 10 is normally difficult to access, resting on the seabed 26, which may be a half-mile or more below surface 28 of the ocean.

Figure 2:
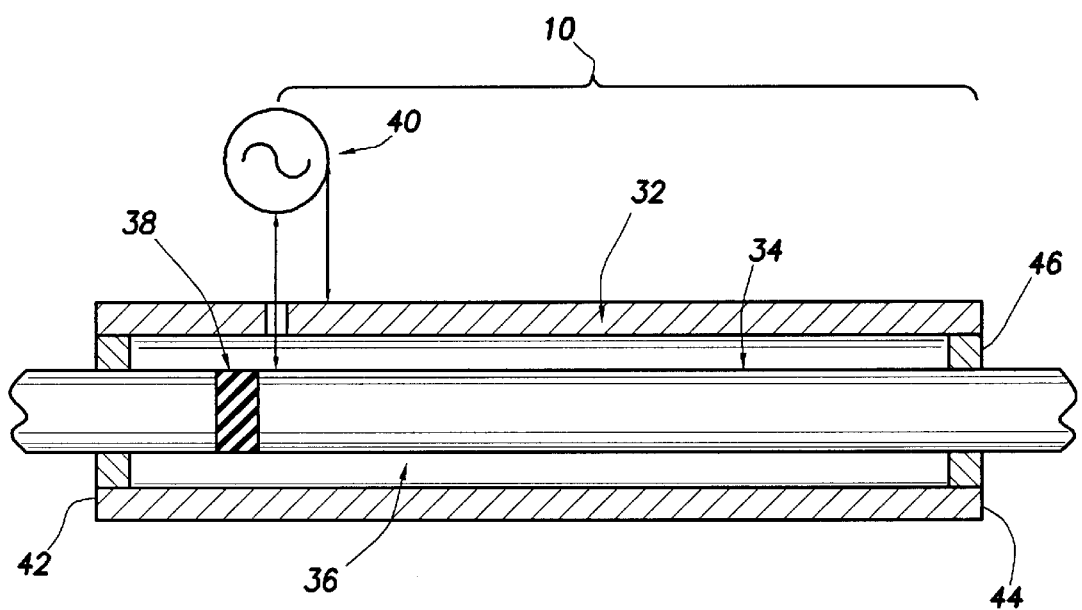
FIG. 2 is a cross-sectional sketch of a pipe-in-pipe configuration for direct heating of a pipeline.

FIG. 2 illustrates a cross-section of heated pipeline 10, which includes electrically conductive outer pipe 32 and electrically conductive product flowline or inner pipe 34 arranged concentrically. Annulus 36 is defined between inner pipe 34 and outer pipe 32. Bulkhead 46 and insulating joint assembly 38 are at the ends of a heated segment. Electrical power input 40 is connected across inner pipe 34 and outer pipe 32. Thus pipe-in-pipe flowline 10 serves as a power transmission line, with the circuit completed by an electrical pathway connecting inner pipe 34 and outer pipe 32 at a second end 44 of the pipeline. By applying power, the entire section or segment of pipe-in-pipe flowline 10 serves as an electrical heater. In. other embodiments, the electrical power input may be provided near the midpoint of pipe-in-pipe flowline 10.

In order to prevent electrical shorts in direct electric heating system, inner pipe 34 must be electrically isolated from outer pipe 32 along the entire length of heated segment 10 of the pipe-in-pipe flowline, except at bulkhead 46, which is used to complete the circuit. Carrier pipe 34 may be thermally insulated to minimize heat loss and to reduce the amount of electrical current necessary to heat the contents of the pipe.

FIG. 3 shows, generally, apparatus 52 for use in an annulus where greater thermal insulative properties are needed. The outer surface of inner pipe 34 may be provided with electrically insulating coating 90, which may be fusion bonded epoxy. Such coating, when applied with an appropriate thickness, such as 20 mils or more, can withstand up to 8000 volts before failing, even after being wetted for several days. Electrically insulating coating 90 may have gaps around weld locations 66, where it is destroyed during welding.

Inner pipe 34 is further thermally and electrically insulated by insulating ring 62, which surrounds inner pipe 34 and layer 90 and extends along the length of inner pipe 34. Insulating ring 62 is preferably made of a thermally and electrically insulative material. A polyurethane foam may be used. Insulating layer ring 62 also serves to centralize inner pipe 34 within outer pipe 32. Insulating layer ring 62 may also have co-extruded solid skin 64 on its outer surface that serves to protect insulating layer ring 62 from mechanical damage during installation. Solid skin 64 may be used to provide a water barrier that protects insulating layer ring 62 if it is porous and to provide an additional layer of electrical insulation.

A water stop may be needed in pipe-in-pipe flowline segment 10 to prevent complete water flooding of annulus 36 in the event of a breach in outer pipe 32 or failure of other equipment in the system. Even partial flooding of annulus 36 may short out electrical heating. As shown in FIG. 3, water stop 102 may be part of annulus apparatus 52 to be used in deeper water parts of a subsea pipeline. Water stops may be used in every quad or less frequently. For instance, water stops such as stop 102 may be used every third quad (480 foot apart) of pipe-in-pipe flowline 10, both in lower-depth section 52 and in shallower-depth section 54 (FIG. 4), to reduce the risk of catastrophic flooding.

Water stops such as stop 102 fill annulus 36 for a selected longitudinal distance. Water stop 102 consists primarily of plug 104 which is contiguous with the outer surface of inner pipe 34 and the inner surface of outer pipe 32. Impermeable seals 106 and 108 are placed on each side of plug 104. The seals are energized by pushing against the plug under pressure. The plug adheres to the pipe or is supported by ridges provided on the pipe. The seals are energized against the plug. All the components of water stop should be made of electrically insulating materials or otherwise electrically insulated.

In order to reduce the mechanical stress on either inner pipe 34 or outer pipe 32 during pipe laying (placing the pipe on the seafloor), mechanical stress is preferably transferred between pipes. This load-sharing may be provided by plugs such as plug 104, which are part of water stops 102. Because plugs 104 are selected to seal the annulus and adhere to the surfaces of both the outer wall of inner pipe 34 and the inner wall of outer pipe 32, they provide the necessary load sharing.

Exposed metal surfaces of pipes in contact with plug 104 are preferably cleaned or sanded so as to form an adherent surface. Examples of plastic include polyurethane. Flowmax 6000, sold by Flowtech Corp. of Houston, Tex. is one such type of polyurethane that functions in this application. Plug 104 then provides mechanical support for adjacent impermeable seals 106 and 108. If outer pipe 32 were breached on either side of water stop 102, sea water would push against one of the impermeable seals 106 and 108. Impermeable seal 106 or 108 would in turn push against plug 104, which is mechanically held in place by its attachment to the piping walls or by ridges that may be provided on the pipe. Plugs may be of any reasonable length, for example, between about 0.5 and 1 meter (1.5–3.0 ft). The preferred length of plug 104 depends on the outside water pressure at operating depth of the pipeline. The higher the external pressure, the more support that impermeable seals 106 and 108 will require in case of a breach of outer pipe 32 or other failure. Plug 104 may also perform as a thermal insulator.

Because plug 104 should adhere to the outer surface of inner pipe 34, insulating layer ring 62 and solid skin 64 may be removed from inner pipe 34 along the length of plug 104. Removal of layer 62 should be minimized to maximize thermal and electrical integrity. For example, in the embodiment shown in FIG. 3, which is designed to operate at pressures near 1500 psi, 5 feet of insulating layer ring 62 are removed to accommodate a 2-ft (0.65 m) -long plug. During installation, care should be taken to avoid contamination by lubricants or other substances of pipe surfaces that will be in contact with plug 104. These substances may prevent plug 104 from properly adhering to those surfaces.

Where plug 104 is made of polyurethane, the adhesion of plug 104 to pipe surfaces may be improved by applying an adherent coating, such as a fusion bonded epoxy, to pipe surfaces that will be in contact with plug 104. Improved bonding may result during plug 104's installation with fusion bonded epoxy on pipe surfaces, because the epoxy may chemically react with polyurethane during cure of the polyurethane.

Seals 106 and 108, placed against the ends of plug 104, may be sized such that they form a tight fit in annulus 36. To yield a tight fit, seals 106 and 108 may be slightly larger, for instance, 1.5 to 2% larger, than the maximum width of annulus 36. Seals 106 and 108 may be made of rubber. Rubbers with a durometer of 40 to 65 are preferred as a material of construction. In addition, a rubber which is not susceptible to charring is preferred so that electrical arcs will not char the seal and self-propagate. Silicone-based rubbers are suitable. In a preferred embodiment, rubber seals with no parting lines (from a mold) on seal surfaces are used. Silicone grease or similar materials may also be applied to the surface of inner pipe 34 where impermeable seals 106 and 108 are installed, to prevent the seals from rolling during installation.

Depending on the method of pipe laying employed, the upper surface of plug 104 may not be perpendicular to the axes of the pipes. This may result when plug 104 is poured into the annulus as a liquid and cures with the axis of the pipes not in a vertical direction, which is a common orientation in pipe-laying operations. If the uppers surface of plug 104 is not perpendicular to the axis of pipes 32 and 34, seal 106 or 108 may fail. This problem may be ameliorated by placing solid angle-correcting piece 110 over plug 104. Solid angle-correcting piece 110 should be constructed of an electrically insulating material that resists arcing along its surface. DELRIN or NYLON (which may be between two pieces of DELRIN) are suitable materials. The lower, angled surface of correcting piece 110 should fit over the angled upper surface of plug 104 such that the upper surface of correcting piece 110 forms a surface perpendicular to the axis of pipes 32 and 34. This method may require that correcting piece 110 be custom manufactured with the appropriate angle on its lower surface. This angle will depend on the angle at which the pipes are held on a pipe-lay barge when the plug material is poured into the annulus.

In one embodiment, seal 108 is formed using an elastomer. An acceptable material is SYLGARD, a product of Dow Corning.

Although a large amount of water in annulus 36 may lead to a catastrophic failure because it may form an electrical short between inner pipe 34 and outer pipe 32, it possible and prudent to design annulus 36 so that small amounts of water will not lead to a system short. Small amounts of water may be present in annulus 36 due to condensation of water vapor in annulus 36 or due to rain and sea water that may enter annulus 36 during the installation of pipe-in-pipe flowline 10. The main concern with water arises in quads that do not lie horizontal. As shown in FIG. 3, in non-horizontal quads, any water present in annulus 36 will run down and collect on impermeable seal 106 or 108, where it can cause a short circuit across annulus 36. This problem is not normally present in horizontally oriented quads because water will spread along the bottom of annulus 36 for the entire length of pipe-in-pipe, flowline 10 between two water stops. In order to prevent the collected water from forming a short circuit in the non-horizontal portion of the pipeline, one or more electrically insulating collars 112 and 114 (FIG. 3) may be formed on seal 106 or 108 to reduce pooling of water across annulus 36. Electrically insulating collars 112 and 114 allow a certain amount water to collect on either side or the collars without shorting the annulus. The preferred height of collars 112 and 114 is determined by the amount of water that may be in the annulus. Collars 112 and 114 are preferably made tall enough to allow several hundred grams of water to collect without causing a short circuit. A suggested height range is about 1.5 to 3 inches, although, other heights may also be suitable. A two collar arrangement such as shown in FIG. 3 can accommodate a ring-shaped desiccant pack 116 between the collars. Only the inner collar can be used. Desiccant pack 116 may be placed on top of seal 106 and held in place by rubber collars 112 and 114, which may be integral with seal 106. Desiccant pack 116 traps water in the annulus and increases the amount of water that can be safely present in quads that are not horizontal. The use of desiccant pack 116 can reduce the need for water-removal techniques, such as placing annulus 36 under vacuum between seals. Desiccant pack 116 removes water (up to its capacity) from anywhere in the section of annulus 36 extending from impermeable seal 106 to the next impermeable seal above it. Desiccant pack 116 may be formed from polyacrylates or other known desiccants.

In each water stop of this embodiment, the impermeable seal which would reside at the higher elevation if the quad were to be positioned at an angle from the horizontal may be equipped with the same water management devices as impermeable seal 106 or 108, shown in FIG. 3. Each of these seals, like impermeable seals 106 and 108 may have two collars 112, 114 and a desiccant pack 116. In addition, seals with the same water management devices as seals 106 and 108 may be installed in quads that do not contain a water stop. For these unsupported impermeable seals, the application of silicone grease to the outer surface of inner pipe 34 where the water seal sits is especially important to prevent the seals from rolling when the pipes move relative to each other.

A shallower-depth design shown in FIG. 4 may be employed in shallower-depth segment 54 where water temperatures are higher. Shallower-depth segment 54 includes the upper-most quads of the riser section 18, shown in FIG. 1.

FIG. 4 illustrates one embodiment of apparatus in annulus 36 in shallower-depth section 54. Insulating layer ring 62 (FIG. 3) may be omitted in shallower-depth section 54 to avoid overheating during electrical power input. In the embodiment shown in FIG. 4, centralizers 82 are used to provide electrical insulation and to centralize inner pipe 34 and outer pipe 32. Centralizers are most often cone-shaped wedges made of nonconductive materials. In one embodiment, centralizers may be composed of multiple parts such as described in U.S. Pat. No. 6,142,707, which is incorporated by reference herein. Centralizers 82 may be present in annulus 36 along the entire length of shallower-depth section 54. The spacing may vary depending upon local conditions, but typically is about 10–20 feet, except at locations containing water stops. The materials of construction for centralizers 82 are selected such that they are able to withstand the voltages present across the annulus and such that they do not char if arcing occurs. DELRIN and NYLON are preferred materials for voltages up to about 4000 volts. The outside surface of centralizers 82 may be beveled such that wet scale, possibly present in annulus 36, is unlikely to form an electrically conductive bridge between inner pipe 34 and outer pipe 32. Collar 84 may also be provided on the top side of the centralizers 82 to further block arcing resulting from any debris lying across the centralizers 82. Carrier pipe 32 may also be surrounded by an electrically insulating layer ring 86. Insulating layer ring 86 provides electrical insulation in case contamination does establish a bridge spanning from inner pipe 34 to outer pipe 32. Insulating layer ring 86 may be a layer of solid polyurethane, approximately 0.25 inch thick. Coating 90 of fusion bonded epoxy may be present on inner pipe 34.

Figure 5:
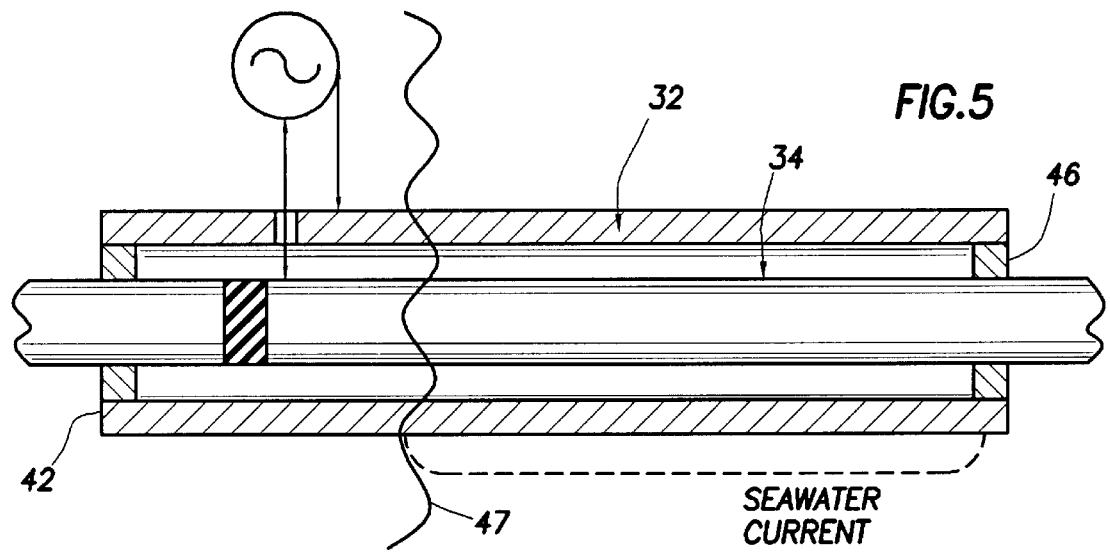
FIG. 5 is a cross-sectional sketch of the pipeline shown in FIG. 2 with an indication of where alternating current leaves and enters the outer pipe when the pipeline is submerged in seawater and electrical current is flowing along the pipeline.

There will be a nominal leakage of electrical current into the seawater surrounding pipe-in-pipe flowline 10 when current is used for heating of the pipeline. FIG. 5 illustrates the locations where the leakage current would enter and leave the outer pipe of the pipeline if the pipe were not electrically insulated. It has been found experimentally and calculated (using well-known electrical current flow modeling of flow from a cylindrical conductor) that current would only leak into or out of the water very near where the pipe enters the water, i.e., within about 1 meter from waterline 47 and 1 meter from bulkhead 46. But if the outside of the pipe is insulated by the usual plastic coating, such as the fusion bonded epoxy described above, there is risk that holidays in the coating will concentrate electrical current and accelerate corrosion at the holidays, causing premature failure of the outside pipe. Calculations show that current will not enter or leave the pipeline at intermediate locations. The amount of leakage current will vary with the voltage and current applied to the pipe and the material and dimensions of the pipe.

Figure 6:
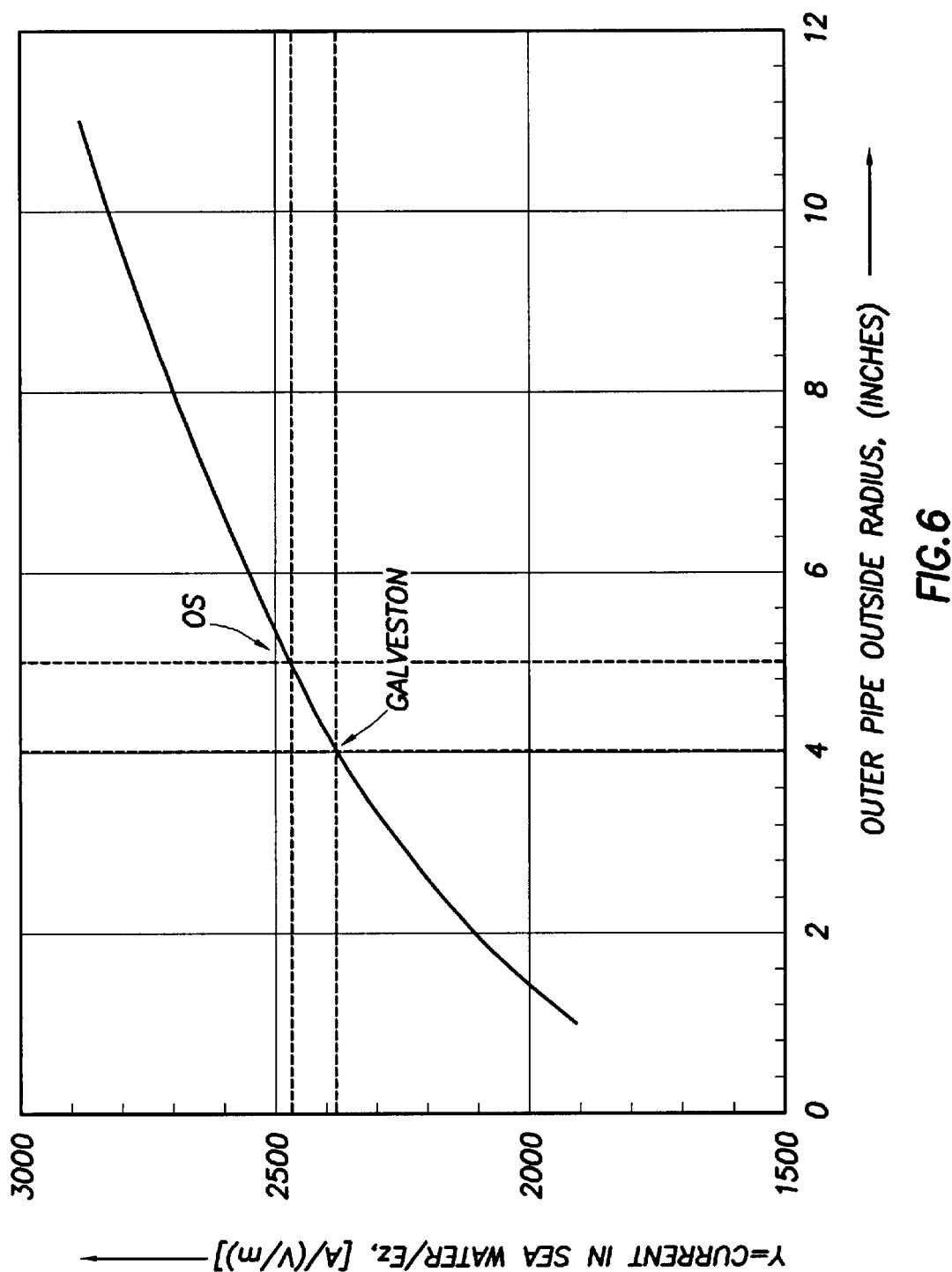
FIG. 6 is a graph showing calculated seawater current from the outer pipe divided by electric field along the pipeline at the outer pipe surface as a function of outer pipe radius.

FIG. 6 shows a graph of calculated values of leakage current in sea water divided by tangential electric field strength at the surface of the outside pipe in the direction of the pipe axis, for different values of pipe diameter. These calculations were made using well-known values of electrical conductivity of sea water and assuming negligible electrical resistance at the sea water-metal interface. For example, for an outer pipe outside radius of 5 inches, the leakage current would be estimated to be about 5 amperes when the electrical field along the pipe axis at the outside radius is $2 \times 10^{-3}$ volt per meter. A significant advantage of the pipe-in-pipe system is that this leakage current is limited by the skin effect (which causes flow of current primarily along the inside of the outside pipe, not along the outside surface).

Figure 7:
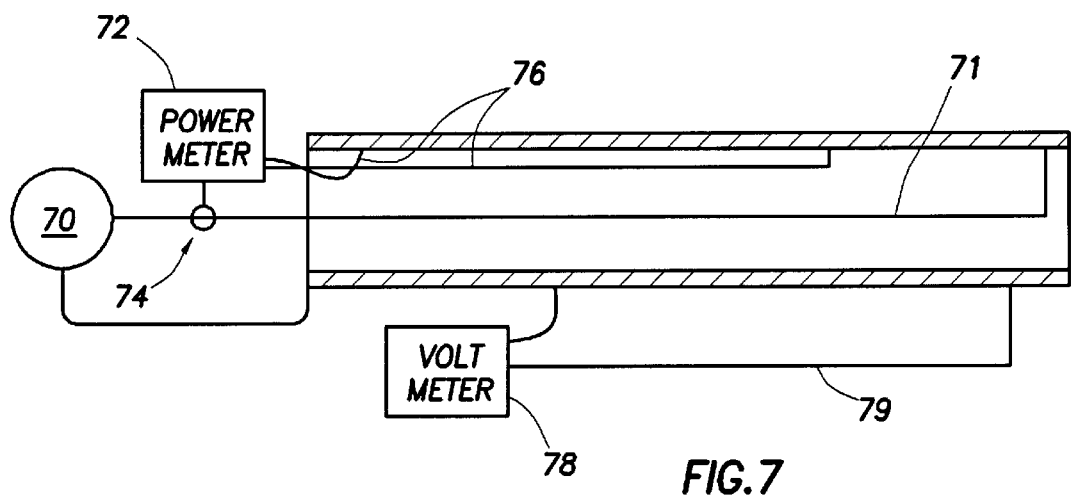
FIG. 7 illustrates a method for measuring electric field at the outer pipe surface.

To estimate leakage current using FIG. 6, it is necessary to estimate field strength in the axial direction at the outside radius of the outer pipe. This value can be estimated from calculations, but it is preferably measured using a joint or joints of the outer pipe, which will include skin effects at the frequency to be used in the pipeline. Apparatus that can be used for making such measurements is shown in FIG. 7. Apparatus that is used also for making impedance measurements of the outside pipe is shown, since it is convenient to make the electric field measurements along with impedance measurements. Electric field strength along the axis of the pipe at the outside surface, the quantity used to estimate leakage current using FIG. 6, is measured by voltmeter 78, connected to wire 79. Power supply 70 supplies a voltage between the end of cable 71 and the end of the pipe. The power supply voltage is adjusted to provide the amount of current that is expected to be used in the application. Current is measured by power meter 72. The power meter also measures the voltage of wire 76. These data are then used to calculate the pipe impedance. The voltage measured by voltmeter 78 is used to calculate the external field along the pipe. Cables 76 and 79 should be connected to the pipe at least two diameters from the end of the pipe.

Figure 8:
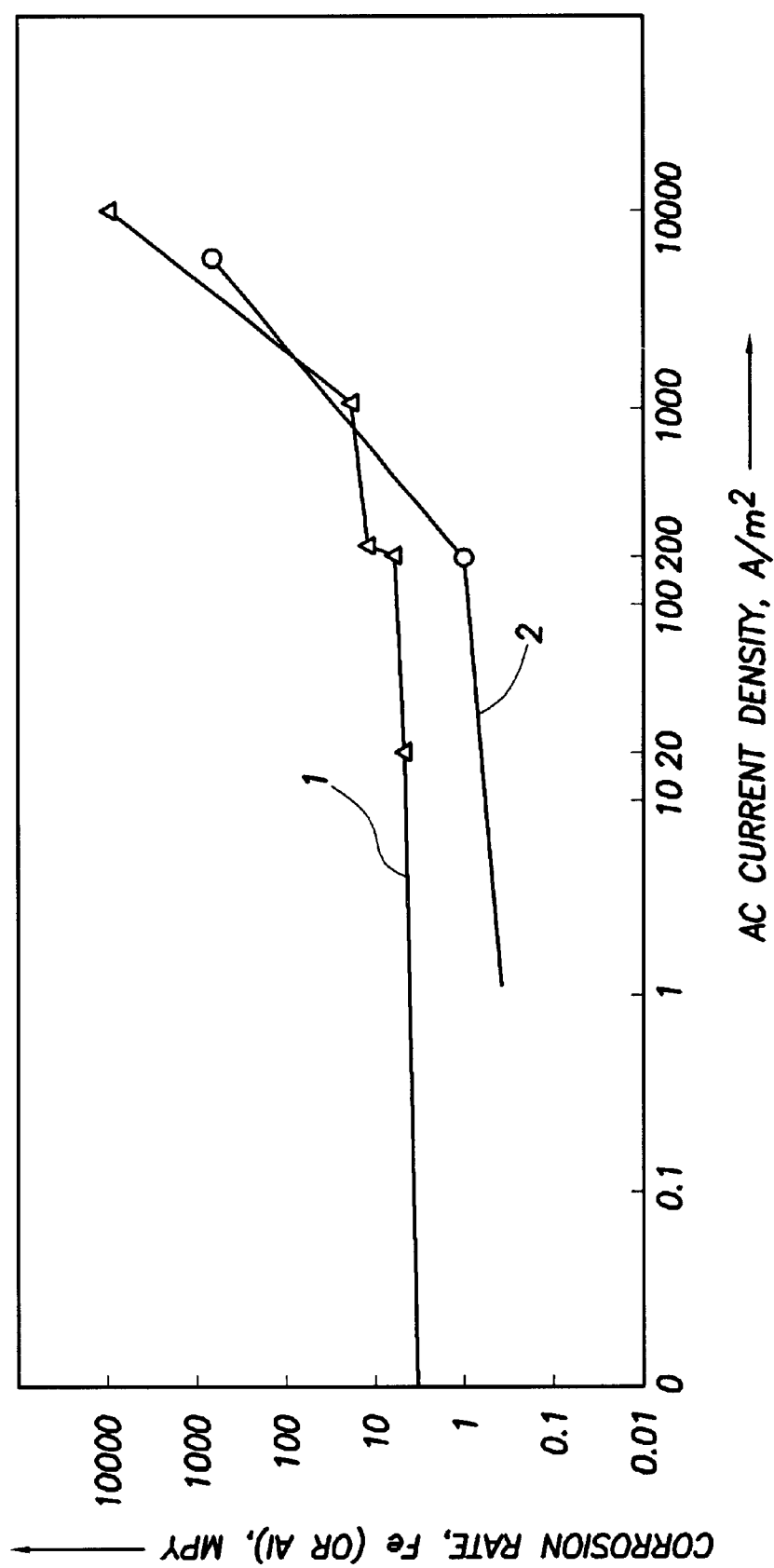
FIG. 8 is a graph of corrosion rate of iron or aluminum in thousandths of an inch per year as a function of alternating current density in amperes per square meter.

FIG. 8 shows the corrosion rate of carbon steel, in thousandths of an inch per year, as a function of AC current density passing through the surface of the metal. These data were obtained by experiments on metal specimens immersed in seawater with 60 Hz AC current applied to the specimens. Curve 1 shows data without the presence of cathodic protection. Note that corrosion rate was not increased above the rate without electrical current flow up a current density of 20 amperes per square meter Curve 1). When cathodic protection was applied, corrosion rate did not significantly increase until current density reached 200 amperes per square meter (Curve 2). Therefore, a current density of 20 amperes per square meter was set as the maximum to be applied to discharge electrodes or bare pipe.

Figure 9:
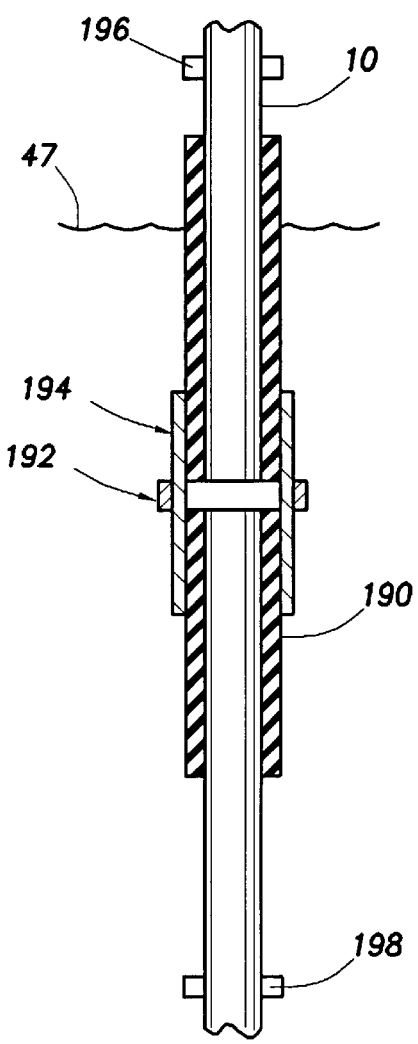
FIG. 9 is a cross-sectional sketch of one embodiment of a current discharge electrode assembly for use near the splash zone.

To decrease the risk that leakage current could increase corrosion rate of the pipeline, a current discharge electrode may be electrically connected to the pipeline. Referring to FIG. 9, in the vicinity of the splash zone a thick splash zone coating 190 is applied. The coating material is preferably rubber, but other electrically insulative materials may be used. A suitable coating is SPLASHTRON, supplied by Mark Tool Company of Lafayette, La. The thickness is much greater than the plastic coating normally used on subsea pipes. Thick coating 190 extends a sufficient distance above water line 47 to protect the pipe from sea water wetting and drying cycles and possible seawater electrical current flow and far enough below water line 47 to insure that leakage current will be directed to a current discharge electrode even if a holiday exists in the epoxy coating on the outside pipe of pipeline 10.

J-lay collar 192 is preferably not coated with coating 190 so that current discharge electrode 194 can be welded or otherwise electrically connected to the collar. Alternatively a wire may connect to electrode 194 and be brought to the surface or a remote location. A J-lay collar is usually welded into the outside pipe of pipeline 10 every quad, or every 160 feet. Electrode 194 may be steel or copper-nickel pipe, or other materials having high electrical conductivity, such as metals. In some operating conditions, use of copper nickel pipe may be advantageously used to provide inhibition of marine growth on the electrode. The electrode may be attached to the thick coating before the coating is vulcanized. The length of electrode 192 may be about 3 meters, for example. The length is selected such that the area of the electrode will be sufficient to bring leakage current density to a value that avoids elevated corrosion rate when leakage current passes through the electrode. Even if cathodic protection is used on the pipeline, a current density less than 20 amperes per square meter may be provided on electrode 194 to insure low corrosion if cathodic protection fails. Experimental results shown in FIG. 8 indicate a current density as high as 200 amperes per square meter can be tolerated with cathodic protection.

Current transformers 196 and 198 may be used to monitor the amount of electrical current passing into our out of the pipeline through electrode 194. Current transformer 198 is preferably placed about 25 feet below electrode 194.

Figure 10:
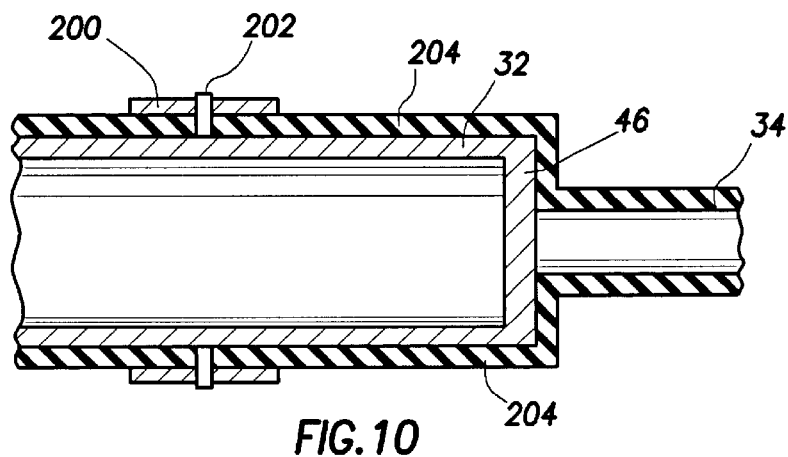
FIG. 10 is a cross-sectional sketch of one embodiment of a current discharge electrode assembly for use near the bulkhead.

FIG. 10 shows an arrangement for handling leakage current and decreasing risk of corrosion at the bulkhead end of a heated segment of pipeline 10. Leakage current will be concentrated near bulkhead 46 because of the same end effects that cause concentration of current near water line 47. Discharge electrode 200, sized as described above for discharge electrode 194, is placed near bulkhead 46. Thick bulkhead zone coating 204 serves the function of insuring that a holiday in the epoxy pipe coating near the bulkhead will not cause accelerated corrosion rates and to insure that all the current flows through current discharge electrode 200. Materials of construction are as described for the splash zone.

Figure 11:
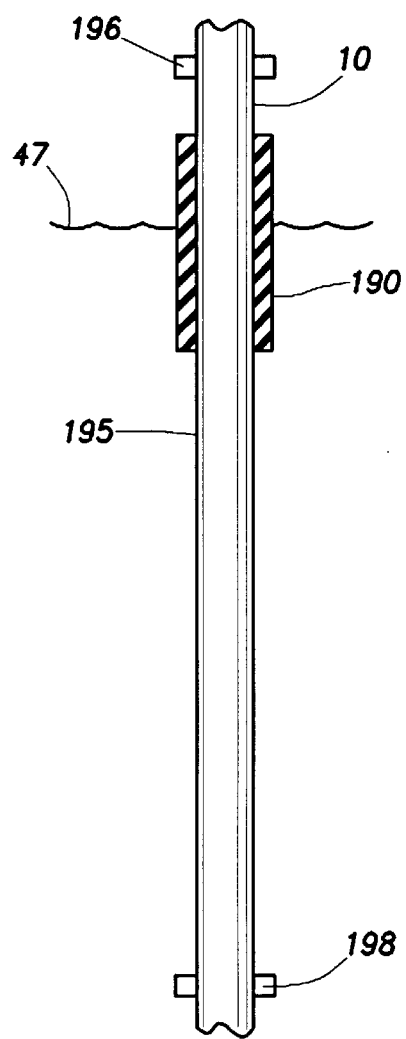
FIG. 11 is a cross-sectional sketch of another embodiment using bare pipe for a current discharge electrode near the splash zone.

The discharge electrodes of FIGS. 9 and 10 may be sized to last the lifetime of a pipeline. They could be replaced if mechanically provided. Alternatively, if corrosion rate is found to be low enough not to deteriorate bare metal on the exterior of pipeline 10, areas of bare metal on the exterior of the pipeline may be provided to serve as discharge electrodes. These areas may be provided by removing in some areas the plastic coating (normally fusion bonded epoxy) routinely used on the exterior of pipeline 10, to expose bare pipe. FIG. 11 shows apparatus similar to that in FIG. 9 but the discharge electrode is area of bare metal 195. Bare metal 195 is sized to have an area that provides current densities low enough to control corrosion rate, as discussed above. Bare metal area 195 may extend over a distance of 10 to 15 feet, for example. Coating 190 may be provided to extend above and below water line 47 as discussed above. Bare metal 195 may be provided in a variety of configurations to achieve the function of a discharge electrode. For example, bare pipe may extend 20 feet below the point where coating 190 ends and the lower segment of coating 190 may be omitted. Current transformers 196 and 198 serve to measure total current leaving or entering pipeline 10 near the water line.

Figure 12:
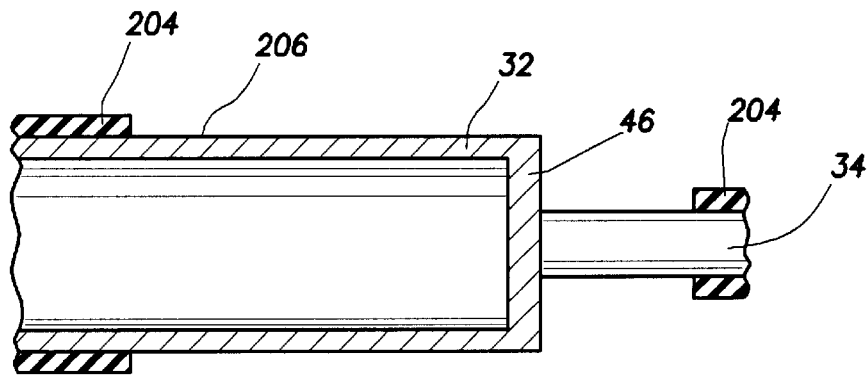
FIG. 12 is a cross-sectional sketch of another embodiment using bare pipe for a current discharge electrode near the bulkhead.

Bare pipe may also be used as discharge electrodes near the bulkhead. FIG. 12 shows one embodiment in which the discharge electrode of FIG. 10 is replaced with bare pipe area 206. Other parts are as discussed above. Bare metal 206 may be provided in a variety of configurations here also. For example, bare pipe may extend 20 feet either side of bulkhead 46 and coating 204 may be omitted.

Although the present invention has been described with reference to specific details, it is not intended that such details should be regarded as limitations upon the scope of the invention, except as and to the extent that they are include in the accompanying claims.

What is claimed is:

1. A method for controlling corrosion during electrical heating of a pipe-in-pipe subsea pipeline, comprising:
   placing the pipeline subsea, the pipeline having an outer pipe, the outer pipe having an exterior surface and having a proximal segment extending through a splash zone and a distal segment in proximity to a bulkhead;
   placing a proximal thick coating on the exterior surface of the proximal segment; and
   placing a proximal current discharge electrode over a portion of the proximal thick coating, the proximal current discharge electrode being electrically connected to a conductor.

2. The method of claim 1 further comprising:
   placing a distal thick coating on the exterior surface of the distal segment and placing a distal current discharge electrode over a portion of the distal thick coating, the distal current discharge electrode being electrically connected to a conductor.

3. The method of claim 1 wherein the conductor is the exterior surface of the proximal segment.

4. A method for controlling corrosion during electrical heating of a pipe-in-pipe subsea pipeline, comprising:
   placing the pipeline subsea, the pipeline having an outer pipe, the outer pipe having an exterior surface and having a proximal segment extending through a splash zone and a distal segment in proximity to a bulkhead;
   placing a proximal thick coating on the exterior surface of the proximal segment; and
   providing a bare metal area adjacent the proximal thick coating.

5. The method of claim 4 further comprising:
   placing a distal thick coating on the exterior surface of the distal segment; and
   providing a bare metal area adjacent the distal thick coating.

6. A method for selecting an area for discharge of leakage current through an outer pipe having an outside surface in proximity to an end of an electrically heated pipe-in-pipe subsea pipeline, comprising:
   determining the effect of an electrical current density on the corrosion rate of an outside surface of the pipeline to select a maximum current density;
   determining the electrical current density in proximity to the end; and
   calculating the area of a discharge electrode that will maintain the electrical current density below the maximum current density.

7. The method of claim 6 wherein the electrical current density in proximity to the end is determined by calculating current density in proximity to the end divided by electric field and measuring electric field along the outer surface near the end.

8. The method of claim 6 wherein the maximum current density is set at 20 amperes per square meter.

9. Apparatus for controlling corrosion during electrical heating of a pipe-in-pipe subsea pipeline, the pipeline having an outer pipe, the outer pipe having an exterior surface and having a proximal segment extending through a splash zone and a distal segment in proximity to a bulkhead, comprising:
   a proximal thick coating on the exterior surface of the proximal segment; and
   a proximal current discharge electrode over a portion of the proximal thick coating, the proximal current discharge electrode being electrically connected to the outer pipe during electrical heating.

10. The apparatus of claim 9 further comprising:
    a distal thick coating on the exterior surface of the distal segment; and
    a distal current discharge electrode over a portion of the distal thick coating, the distal current discharge electrode being electrically connected to a conductor.

11. The apparatus of claim 10 wherein the conductor is the exterior surface of the proximal segment.

12. The apparatus of claim 10 further comprising a pair of current transformers disposed on each side of the distal thick coating.

13. Apparatus for controlling corrosion during electrical heating of a pipe-in-pipe subsea pipeline, the pipeline having an outer pipe, the outer pipe having an exterior surface and having a proximal segment extending through a splash zone and a distal segment in proximity to a bulkhead, comprising:
    a proximal thick coating on the exterior surface of the proximal segment; and
    a bare metal area in proximity to the proximal thick coating.

14. The apparatus of claim 13 further comprising:
    a bare metal area on the exterior surface of the distal segment.

15. The apparatus of claim 14 further comprising a pair of current transformers disposed on each side of the bare metal area.

* * * * *